US009564012B2

(12) United States Patent
Indrakumar

(10) Patent No.: US 9,564,012 B2
(45) Date of Patent: Feb. 7, 2017

(54) GAMING SYSTEM AND A METHOD OF GAMING

(71) Applicant: Aristocrat Technologies Australia Pty Limited, North Ryde (AU)

(72) Inventor: Kuppam Indrakumar, Las Vegas, NV (US)

(73) Assignee: Aristocrat Technologies Australia Pty Limited, North Ryde, NSW (AU)

( * ) Notice: Subject to any disclaimer, the term of this patent is extended or adjusted under 35 U.S.C. 154(b) by 180 days.

(21) Appl. No.: 14/246,381

(22) Filed: Apr. 7, 2014

(65) Prior Publication Data

US 2014/0309022 A1 Oct. 16, 2014

(30) Foreign Application Priority Data

Apr. 11, 2013 (AU) ................................ 2013901245

(51) Int. Cl.
*A63F 13/00* (2014.01)
*G07F 17/32* (2006.01)

(52) U.S. Cl.
CPC ....... *G07F 17/3258* (2013.01); *G07F 17/3262* (2013.01)

(58) Field of Classification Search
CPC ... G07F 17/32; G07F 17/3211; G07F 17/3262
USPC ......................................... 463/16, 20, 25, 27
See application file for complete search history.

(56) References Cited

U.S. PATENT DOCUMENTS

| | | | | | |
|---|---|---|---|---|---|
| 2004/0023707 | A1* | 2/2004 | Maya | G07F 17/3262 | 463/16 |
| 2004/0162128 | A1* | 8/2004 | Baerlocher | G07F 17/32 | 463/16 |
| 2004/0224746 | A1* | 11/2004 | Fong | G07F 17/3211 | 463/16 |
| 2005/0176498 | A1* | 8/2005 | Nguyen | G07F 17/32 | 463/25 |
| 2005/0239542 | A1* | 10/2005 | Olsen | G07F 17/32 | 463/27 |
| 2007/0129139 | A1* | 6/2007 | Nguyen | G07F 17/3262 | 463/25 |

* cited by examiner

*Primary Examiner* — James S McClellan
(74) *Attorney, Agent, or Firm* — Armstrong Teasdale LLP

(57) ABSTRACT

A gaming system is disclosed that comprises a prize selector arranged to facilitate player selection of at least one prize of a plurality of prizes, each prize having an associated prize value. The gaming system also includes a prize eligibility determiner arranged to determine whether a prize is eligible to be awarded to the player based on a relationship between a prize pool value and the prize value associated with the prize, the prize pool value being associated with game play, and a winning condition determiner arranged to determine whether a winning condition exists. The gaming system is arranged to award the selected prize to the player if the prize has been determined to be eligible and a winning condition has been determined.

39 Claims, 7 Drawing Sheets

GAMING SYSTEM AND A METHOD OF GAMING

RELATED APPLICATIONS

This application claims priority to Australian Provisional Patent Application No. 2013901245 having an International filing date of Apr. 11, 2013, which is incorporated herein by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

A gaming machine can be arranged to enable a player to win a jackpot award while playing on the gaming machine, for example in response to a random event occurring. Such jackpot awards are pre-determined by a jackpot controller associated with the gaming machine.

In some arrangements, the jackpot controller uses a progressive pool amount to determine when to award the jackpot prize to a player. In one example, the progressive pool amount is set to a base amount, such as $10,000, and a portion of each wager made on the gaming machine, or on a linked gaming machine, is put towards the progressive pool amount.

The jackpot controller will select a random value between two predefined amounts, for example between $50,000 and $60,000, and award the jackpot prize to a player whose wager causes the progressive pool amount to equal or exceed the random value selected by the jackpot controller. For example, if the jackpot controller randomly selects a value of $57,585, the player causing the progressive pool amount to equal or exceed $57,585 will be awarded the jackpot prize.

Once the jackpot prize has been awarded, the progressive pool amount is reset to the base amount, which is $10,000 in this example, and the process is repeated. Players who know that a jackpot was hit recently will know that it will take a long time for the progressive pool amount to reach jackpot levels again, and may avoid playing gaming machines that are linked to a particular jackpot controller that recently awarded a jackpot prize.

BRIEF SUMMARY OF THE INVENTION

In accordance with a first aspect of the present invention, there is provided a gaming system comprising:

a prize selector arranged to facilitate player selection of at least one prize of a plurality of prizes, each prize having an associated prize value;

a prize eligibility determiner arranged to determine whether a prize is eligible to be awarded to the player based on a relationship between a prize pool value and the prize value associated with the prize, the prize pool value being associated with game play; and a winning condition determiner arranged to determine whether a winning condition exists;

wherein the gaming system is arranged to award the selected prize to the player if the prize has been determined to be eligible and a winning condition has been determined.

A prize may be determined to be eligible if the prize pool value is greater than or equal to the prize value associated with the prize.

In one embodiment, a winning condition is determined if the prize pool value is greater than or equal to a trigger value. In one embodiment, the trigger value is randomly selected from a value range. The value range may include within its range at least one prize value associated with a prize.

In an alternative embodiment, a winning condition is determined to exist in response to a game event, for example a particular game outcome or the generation of at least one particular random number. A particular game outcome may be, for example, a specific symbol combination that occurs on a gaming machine that is linked to the gaming system.

It will be appreciated that the winning condition may be determined to occur in respect of a game played by a further player, for example on a gaming machine that is linked to the gaming system. The gaming system may comprise a network interface that is arranged to facilitate receiving information indicative of a winning condition that occurs in respect of a linked gaming machine.

The prize selector may be arranged to facilitate player selection of a prize from only prizes that are determined to be eligible.

The gaming system may be arranged to select at least one prize of the plurality of prizes, wherein the player selected prize is awarded to the player if the gaming system has selected the prize selected by the player. The gaming system may be arranged to select from only prizes that are determined to be eligible.

In one embodiment, the gaming system is arranged to select a further prize after selecting a first prize if:

the prize selected by the player has been determined to be eligible and a winning condition has been determined; and the first prize selected by the gaming system was not the same prize selected by the player.

The gaming system may be arranged to select the further prize from prizes that have been determined to be eligible prizes and that have an associated prize value that is higher than the prize value associated with the first prize. The further prize may have an associated prize value that is next highest in value than the prize value associated with the first prize.

If the first prize has an associated prize value that is higher than other eligible prizes, the gaming system may be arranged to select a further prize having an associated prize value that is lower than the prize value associated with the first prize. In one example, the further prize has an associated prize value that is lowest compared to the prize value associated with the other prizes.

In one embodiment, wherein if each player of a plurality of players has selected a prize that has been determined to be eligible, and a winning condition has been determined, the gaming system is arranged to determine which player of the plurality of players will receive the prize. In one embodiment, the gaming system is arranged to randomly determine which player of the plurality of players will receive the prize. Alternatively, the gaming system may be arranged to determine which player will receive the prize based on a further prize selection performed by each player. In an embodiment wherein the gaming system is arranged to select an eligible prize, the gaming system is arranged to select a player to receive the prize from players that performed a further prize selection and selected the same prize that was selected by the gaming system.

The prize selector may be arranged to facilitate prize selection by the gaming system, or the gaming system may comprise a further prize selector that is arranged to facilitate prize selection by the gaming system.

In one embodiment, the prize pool is a progressive jackpot prize pool and the prize pool value is a value of the progressive jackpot prize pool.

In one embodiment, the prizes are jackpot prizes and the prize selector is arranged to facilitate selection of at least one jackpot prize of a plurality of jackpot prizes.

In accordance with a second aspect of the present invention, there is provided a method of gaming comprising the steps of:

- facilitating player selection of at least one prize of a plurality of prizes, each prize having an associated prize value;
- determining whether a prize is eligible to be awarded to the player based on a relationship between a prize pool value and the prize value associated with the prize, the prize pool value being associated with game play;
- determining whether a winning condition exists; and
- awarding the selected prize to the player if the prize has been determined to be eligible and a winning condition has been determined.

In accordance with a third aspect of the present invention, there is provided a jackpot controller comprising:

- a network interface arranged to receive information indicative of a player's selection of at least one prize of a plurality of prizes, each prize having an associated prize value;
- a prize eligibility determiner arranged to determine whether a prize is eligible to be awarded to the player based on a relationship between a prize pool value and the prize value associated with the prize, the prize pool value being associated with game play; and
- a winning condition determiner arranged to determine whether a winning condition exists;
- wherein the jackpot controller is arranged to facilitate awarding the selected prize to the player if the prize has been determined to be eligible and a winning condition has been determined.

In accordance with a fourth aspect of the present invention, there is provided a gaming machine comprising:

- a prize selector arranged to facilitate player selection of at least one prize of a plurality of prizes, each prize having an associated prize value; and
- a network interface arranged to communicate information indicative of a player's selection of at least one prize to a jackpot controller, the jackpot controller being arranged to:
  - determine whether a prize is eligible to be awarded to the player based on a relationship between a prize pool value and the prize value associated with the prize, the prize pool value being associated with game play;
  - determine whether a winning condition exists; and
- facilitate awarding the selected prize to the player if the prize has been determined to be eligible and a winning condition has been determined.

In accordance with a fifth aspect of the present invention, there is provided a computer program arranged when loaded into a computing device to instruct the computing device to operate in accordance with the gaming system of the first aspect.

In accordance with a sixth aspect of the present invention, there is provided a computer readable medium having a computer readable program code embodied therein for causing a computing device to operate in accordance with the gaming system of the first aspect.

In accordance with a seventh aspect of the present invention, there is provided a data signal having a computer readable program code embodied therein to cause a computing device to operate in accordance with the gaming system of the first aspect.

BRIEF DESCRIPTION OF SEVERAL VIEWS OF THE DRAWINGS

In order that the present invention may be more clearly ascertained, embodiments of the present invention will now be described, by way of example only, with reference to the accompanying drawings, in which.

DETAILED DESCRIPTION OF THE INVENTION

Figure 1:
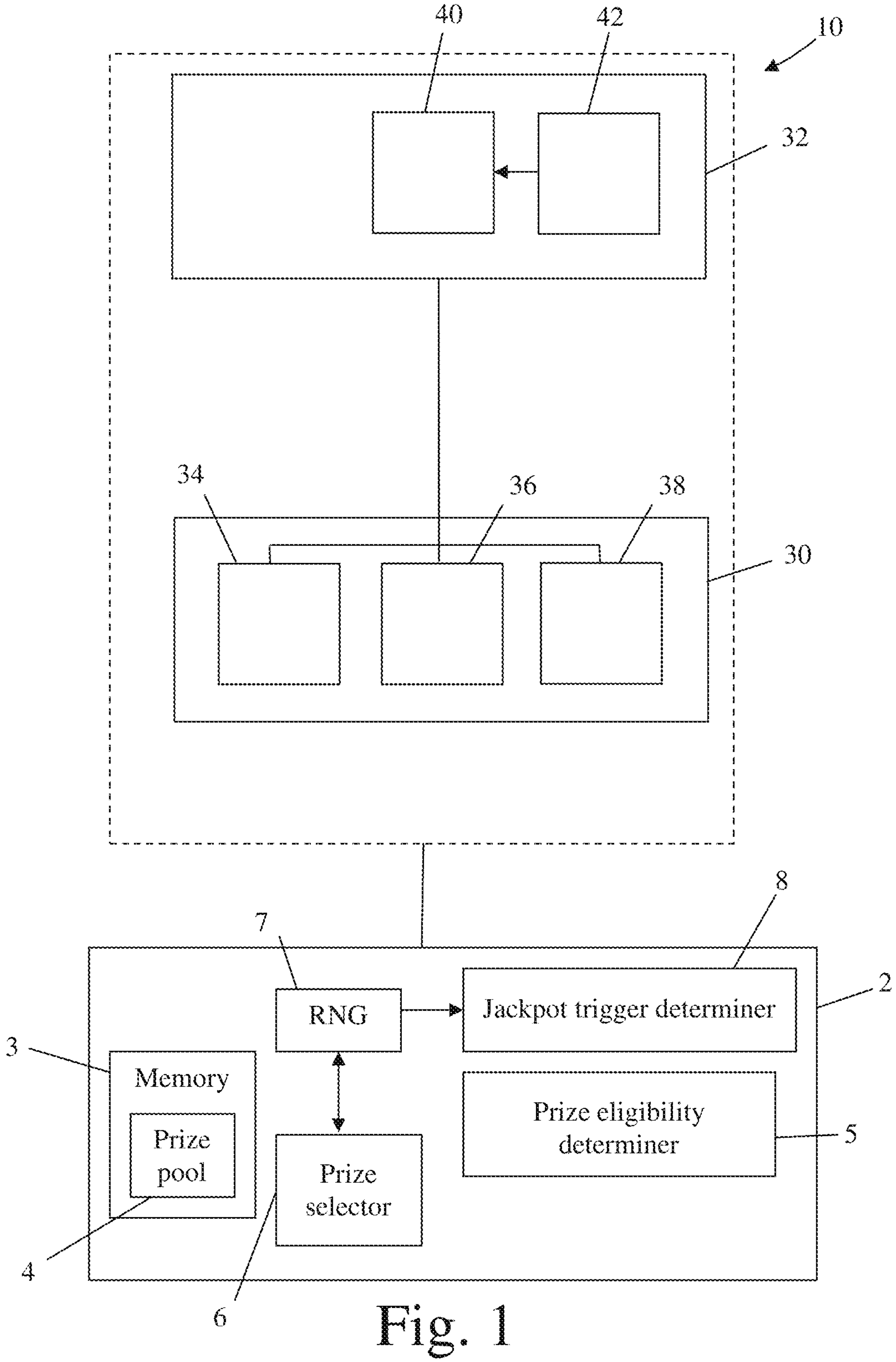
FIG. 1 is a schematic block diagram of components of a gaming machine and a jackpot controller in accordance with an embodiment of the present invention.

Embodiments of the present invention relate to a gaming system and to a method of gaming. In general, the gaming system operates such that a player is able to select a prize, such as a jackpot prize, from a plurality of prizes.

Each prize has an associated prize value and the gaming system is arranged to determine whether a particular prize is eligible to be awarded based on a relationship between a prize pool value, such as a progressive jackpot value, and the value associated with the prize. In one example, a prize is determined to be eligible if the prize pool value is greater than or equal to the prize value associated with the prize.

The player would typically select a prize, then play a game at one of a plurality of linked gaming machines. In one embodiment, at least a portion of each wager made on a linked gaming machine is added to the prize pool value.

The gaming system is also arranged to determine whether a winning condition exists, such as a jackpot prize winning condition.

In an embodiment, if the prize selected by the player is determined to be an eligible prize, and a winning condition has been determined, then the prize selected by the player is awarded to the player.

Alternatively, the gaming system may be arranged to select a prize from the plurality of prizes, and to only award the player selected prize to the player if the player selected prize has, in addition to being determined to be eligible, and in addition to a winning condition being determined, also been selected by the gaming system.

Typically, the winning condition is a jackpot prize winning condition, such as random generation of a particular number in response to a wager made on a gaming machine having a jackpot award or that is linked to a progressive jackpot system or similar. Alternatively, the winning condition may be a particular game outcome, for example a specific symbol combination that occurs on a gaming machine that is linked to the gaming system.

Alternatively, the winning condition may be related to the prize pool value. For example, the winning condition may be determined if the prize pool value is greater than or equal to a trigger value. In one embodiment, the trigger value is randomly selected from a value range. The value range may include within its range at least one prize value associated with a prize.

In one example, the gaming system is arranged to implement a game that can be played on any of a plurality of linked gaming machines. The gaming system, or individual gaming machines, can be arranged to operate such that, during game play, a plurality of symbols are randomly selected from a set of symbols and displayed at a corresponding plurality of display position groups of a gaming machine, each of which comprises a plurality of display positions. The symbols shown at the display positions are used to determine game outcomes by comparing the displayed symbols with defined winning combinations.

In one type of gaming machine, a display area including 15 display positions is presented to a player with each display position including one symbol. The display positions are arranged in five vertically disposed reels, with each reel having three visible display positions. After the reels are spun and subsequently stopped, the display positions show a random selection of symbols.

Generally, with such games, a plurality of win patterns in the form of win lines are defined which extend across the reels and include one display position from each reel. Typically the symbols that form a win line are compared with winning symbol combinations defined in a pay table so as to determine whether a player of the game should receive an award. For example, if winning symbol combinations are based on poker hands, a particular prize would be awarded if the win line comprises four aces. Other winning symbol combinations and corresponding prizes may also be defined by a pay table.

In an embodiment of the present invention, at least one winning symbol combination corresponds to a jackpot trigger and when this occurs a jackpot trigger is determined to exist.

In a further embodiment, each time a wager is made, a random number is generated. If the generated random number is within a trigger range, or is the same as a trigger number, a jackpot trigger is determined.

In a still further embodiment, the gaming system is arranged to generate a random value between, or randomly select a value from, a value range to be a trigger value. When the prize pool value equals or exceeds the trigger value, for example in response to a wager made by a player, a jackpot trigger is determined.

For each of these embodiments, determination of a jackpot trigger may result in a player being awarded the prize the player selected. It will be appreciated that determination of a jackpot trigger may result in any player playing on a gaming machine that is linked to the gaming system being awarded a prize selected by the player. For embodiments wherein the gaming system is arranged to select a prize, a first player playing at a first gaming machine may trigger a jackpot trigger, and a further player of a further gaming machine that is linked to the first gaming machine may receive a prize selected by the further player. Such a situation may occur if, for example, the first player has selected a prize that is not the same as a prize selected by the gaming system, but the further player has selected the prize that is selected by the gaming system.

The allocated prize may be a jackpot prize. While in the present embodiments, a prize selected by a player is one of a plurality of selectable jackpot prizes, it will be appreciated that this is just one example of a selectable prize type, and other prizes, such as standard prizes, are envisaged to be selectable.

A gaming system that utilises the general concept of facilitating selection of a prize from a plurality of prizes by a player, determining whether the selected prize is eligible, determining whether a winning condition exists, and awarding the selected prize to the player if the prize is determined to be eligible and the winning condition is determined to exist will now be described in more detail.

The description that follows generally describes a gaming system that comprises a plurality of gaming machines linked to a jackpot controller. In these examples, each gaming machine is arranged to display virtual reels, however it will be appreciated that gaming machines that employ mechanical reels are also envisaged.

Referring to the drawings, there is shown a schematic block diagram of a gaming machine 10 arranged to implement a probabilistic game of the type wherein several symbols from a set of symbols are randomly displayed, and a game outcome is determined on the basis of the displayed symbols. The gaming machine 10 is of the type including multiple game modes such as being operable in normal game mode wherein a base game is implemented and special game mode wherein a feature game is implemented.

With some such probabilistic games, the set of symbols used during normal game mode include standard symbols and function symbols, and the game outcome is determined on the basis of the displayed standard symbols and the function associated with any displayed function symbol. For example, standard symbols may resemble fruit such as apples, pears and bananas with a win outcome being determined when a predetermined number of the same fruit appear on a display along a win line, or are displayed according to defined outcome patterns such as scattered, and so on. The function associated with a function symbol may be, for example, a wild function wherein display of the function symbol is treated during consideration of the game outcome as any of the standard symbols. A function symbol may be represented as the word “WILD”, a star, or by any other suitable word or symbol. Other functions are also envisaged such as scatter functions, multiplier functions, repeat win functions, jackpot functions and feature commencement functions.

Referring to FIG. 1, a schematic diagram of components of a gaming machine 10 and a jackpot controller 2 in accordance with the present embodiment is shown. The components of the gaming machine 10 comprise a player interface 30 and a game controller 32. The player interface 30 is arranged to enable interaction between a player and the gaming machine 10 and for this purpose includes input/output components required for the player to enter instructions and play the game.

Components of the player interface 30 may vary but will typically include a credit mechanism 34 to enable a player to input credits and receive payouts, one or more displays 36 which may comprise a touch screen, and a game play mechanism 38 arranged to enable a player to input game play instructions.

Figure 3:
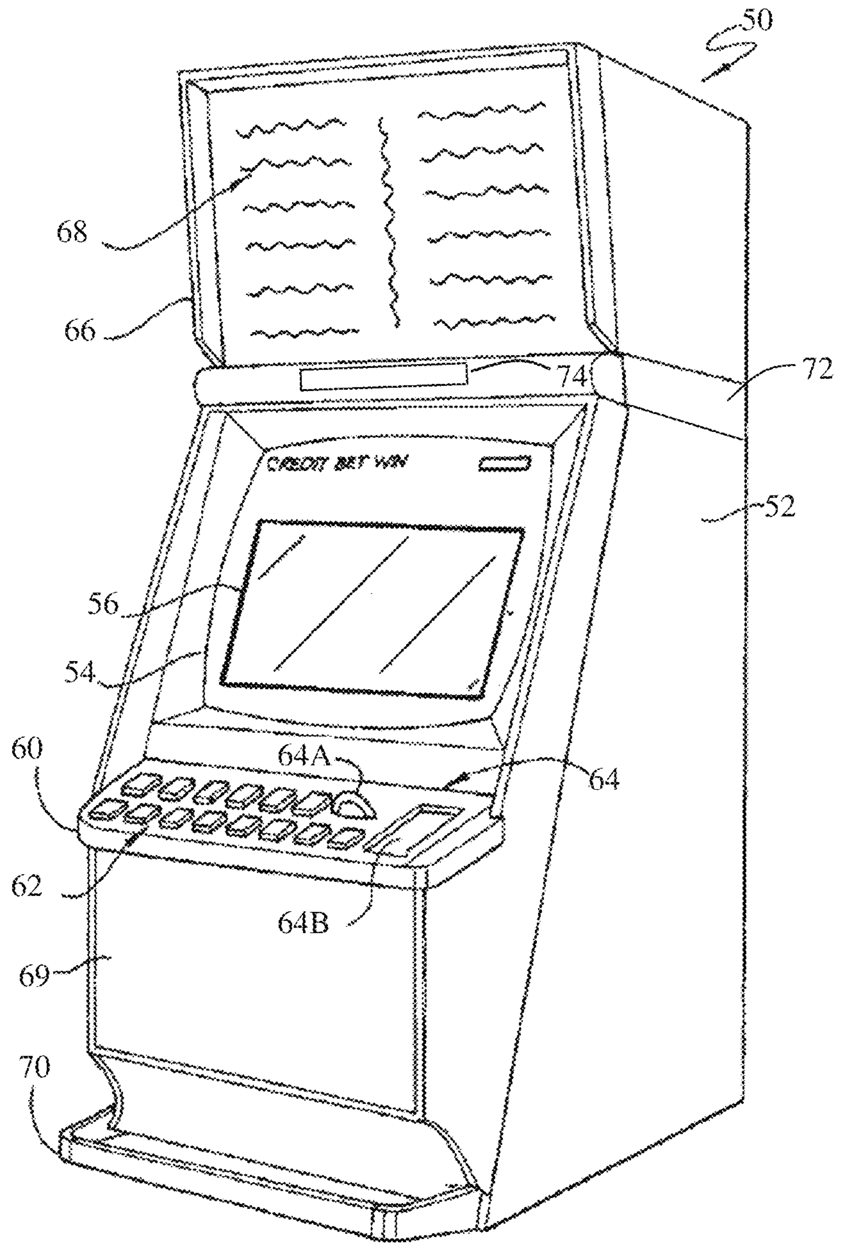
FIG. 3 is a diagrammatic representation of a gaming machine in accordance with an embodiment of the present invention with the gaming system implemented in the form of a stand-alone gaming machine.

The player instructions may be input by pressing appropriate buttons such as buttons 62 shown in FIG. 3, or by interacting with a display 54 that comprises a touch screen usable by the player to interact with the gaming machine 10.

In this example, the game play mechanism 38 is arranged to allow a player to select a jackpot prize from a plurality of jackpot prizes, and to instruct the gaming machine 10 to initiate a game.

The game controller 32 is in data communication with the player interface 30 and typically includes a processor 40 arranged to process game play instructions and output game play outcomes to the display 36. Typically, the game play instructions are stored as program code in a memory 42 that can also be hardwired. It will be understood that in this specification the term "processor" is used to refer generically to any device that can process game play instructions and may include a microprocessor, microcontroller, programmable logic device or other computational device such as a personal computer or a server.

In this example, the gaming machine 10 is one of a plurality of gaming machines that are linked to the jackpot controller 2. The gaming machine 10 is arranged to facilitate player selection of a jackpot prize and to facilitate playing a game, and the jackpot controller 2 is arranged to determine whether a selected jackpot prize is an eligible prize and whether a jackpot winning condition exists. The jackpot controller 2 facilitates awarding of the selected jackpot prize to the player if the jackpot prize is eligible and a jackpot winning condition has been determined.

The jackpot controller 2 is in communication with the gaming machine 10, and is arranged to receive information that is indicative of a player's jackpot prize selection and store the information in a memory 3 of the jackpot controller 2.

In this example, the memory 3 also stores prize data that is indicative of a plurality of player selectable jackpot prizes. The prize data is also indicative of a prize value associated with each jackpot prize.

The jackpot controller 2 is also arranged to store prize pool data 4 that is indicative of a prize pool value that has accumulated, in this example as a result of wagers made on gaming machines 10 that are linked to the jackpot controller 2. In this example, the prize pool value is indicative of a progressive jackpot value, wherein a portion of each wager made in respect of gaming machines 10 linked to the jackpot controller 2 is added to the prize pool 4.

The jackpot controller 2 also comprises a prize eligibility determiner 5 that is arranged to determine which jackpot prizes of the plurality of jackpot prizes are eligible prizes by comparing a prize value associated with each jackpot prize with the value of the prize pool 4. In this example, a prize is determined to be eligible if the value of the prize pool 4 is greater than or equal to the prize value associated with the prize. Information that is indicative of prizes that have been determined to be eligible is stored in the memory 3.

If a prize that has been selected by the player is a prize that has been determined to be eligible by the prize eligibility determiner 5, then the prize selected by the player is eligible to be awarded to the player.

The information that is indicative of eligible prizes is also used by a prize selector 6 of the jackpot controller 2 in selecting a prize, as described below.

The prize selector 6 is arranged to select a jackpot prize from the plurality of jackpot prizes that have been determined to be eligible, and information that is indicative of the selection made by the prize selector 6 is stored in the memory 3. In this example, the prize selector 6 is arranged to randomly select a jackpot prize from the plurality of jackpot prizes that have been determined to be eligible by using an input from a random number generator 7.

The prize selection made by the prize selector 6 is in addition to the prize selection made by the player, and can be used to determine whether or not to award a selected prize to the player. In one example, the player is only awarded a jackpot prize if the player selects the same jackpot prize as selected by the prize selector 6.

The jackpot controller 2 also comprises a jackpot trigger determiner 8. The jackpot trigger determiner 8 is arranged to determine that a trigger condition exists if the value of the prize pool 4 equals or exceeds a randomly selected trigger value. The randomly selected trigger value can be selected by the jackpot trigger determiner 8, for example by using an input from the random number generator 7. In this example, the trigger value is randomly selected from a range of values that includes within its range the values of the jackpot prizes.

In the example of the jackpot controller 2, the prize eligibility determiner 5, the prize selector 6, the random number generator 7 and the jackpot trigger determiner 8 are at least partly implemented using a processor (not shown) associated with the jackpot controller 2 and associated software although it will be understood that other implementations are envisaged.

Figure 2:
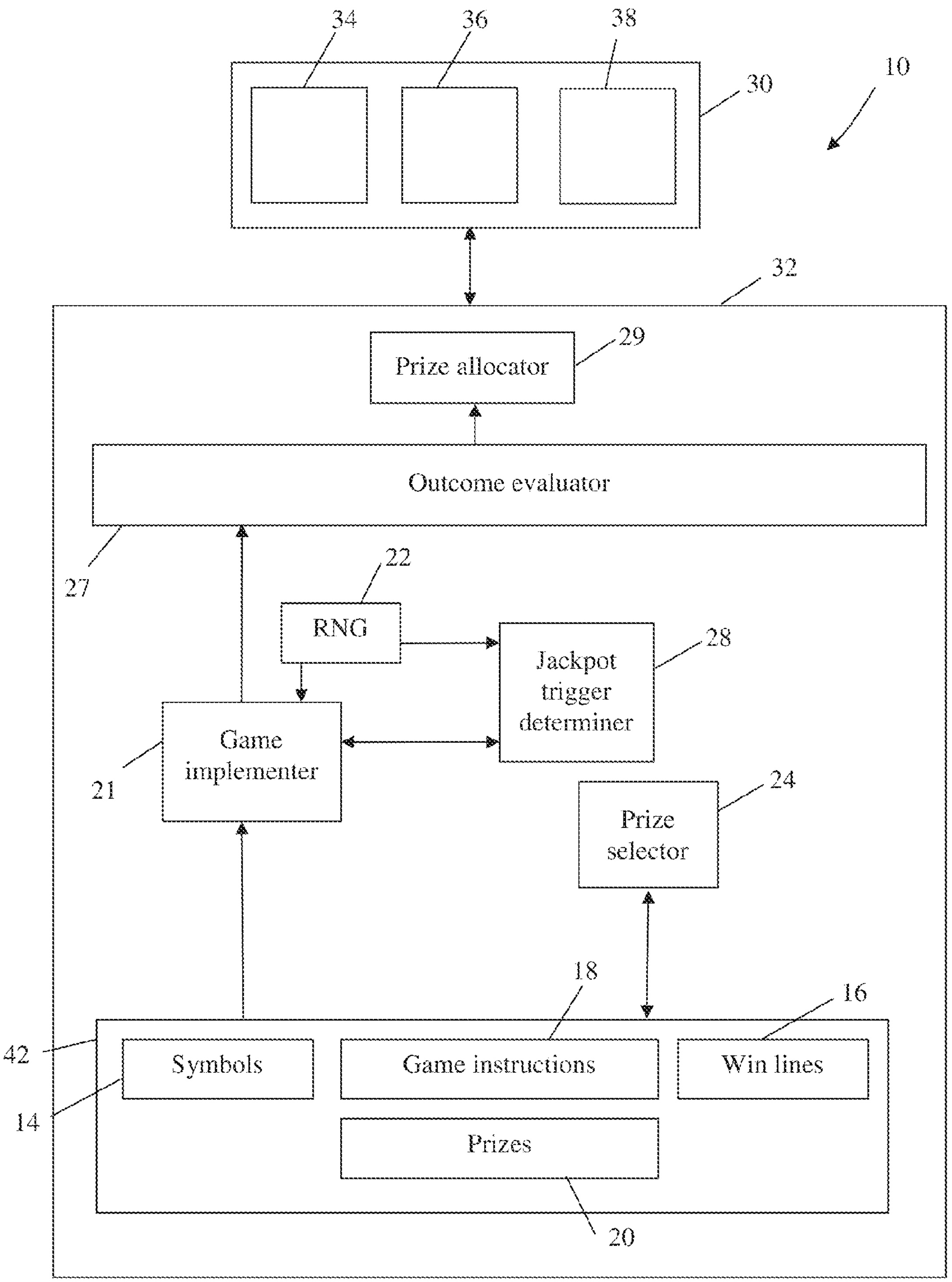
FIG. 2 is a schematic block diagram of functional components of a gaming machine in accordance with an embodiment of the present invention.

A functional diagram illustrating operative components of the game controller 32 is shown in FIG. 2.

The memory 42 is arranged to store symbols data 14 indicative of a plurality of symbols, in the present example associated with a plurality of reels, win lines data 16 indicative of available win lines, game instruction data 18 indicative of game instructions usable by the gaming machine 10 to control operation of the game, and prize data 20 indicative of a plurality of jackpot prizes that a player is able to select from.

The game controller 32 comprises a game implementer 21 which is arranged to select several symbols from the available symbols 14 for display to a player in a plurality of display positions of the reels. In this example, the selection carried out by the game implementer 21 is made using a random number generator 22.

It will be appreciated that the random number generator 22 may be of a type which is arranged to generate pseudo random numbers based on a seed number, and that in this specification the term "random" will be understood accordingly to mean truly random or pseudo random.

The game controller 32 further includes a prize selector 24 that is arranged to facilitate selection of a jackpot prize from the prize data 20 by a player. The prize selector 24 is in communication with the jackpot controller 2 and is arranged to facilitate selection, by a player or by the gaming system, of only jackpot prizes that have been determined to be eligible. That is, the gaming system 10 is arranged such that a player is able to select jackpot prizes that have an associated prize value that is less than or equal to the prize pool value.

Information indicative of a jackpot prize selected by a player can be stored in the memory 42, and is communicated to the jackpot controller 2 for storing in the memory 3 of the jackpot controller 2.

The game controller 32 also comprises an outcome evaluator 27 which, in accordance with game instructions 18 determines game outcomes based on the symbols selected by the game implementer 21.

The game controller also comprises a jackpot trigger determiner 28. The jackpot trigger determiner 28 is arranged to determine if a jackpot trigger condition exists. The jackpot trigger determiner 28 can be arranged to determine if a jackpot trigger condition exists in accordance with various methods. For example, and as mentioned earlier, the jackpot trigger determiner 28 may be arranged to determine if a predefined game event occurs, such as a winning symbol combination that corresponds to a jackpot trigger or the generation of a random number that is within a trigger range, or is the same as a trigger number, in response to a wager.

It will be appreciated that the jackpot trigger determiner 28 can be used separately or in conjunction with the jackpot trigger determiner 8 of the jackpot controller 2, with each jackpot trigger determiner 8, 28 being arranged to determine a jackpot trigger condition in a different manner. In this example, the jackpot trigger determiner 28 of the gaming machine 10 is arranged to determine a jackpot trigger that occurs in respect of that particular gaming machine 10, whereas the jackpot trigger determiner 8 of the jackpot controller 2 is arranged to determine a jackpot trigger that occurs in respect of a game that is played on any gaming machine 10 that is linked to the jackpot controller 2.

The game controller 32 also comprises a prize allocator 29 arranged to allocate a prize to a player when a winning outcome exists. The prize allocator 29 is also arranged to allocate a prize selected by a player if the selected prize has been determined to be eligible and if a jackpot trigger has been determined, for example by the jackpot controller 2.

In this embodiment, the game implementer 21, the random number generator 22, the prize selector 24, the outcome evaluator 27, the jackpot trigger determiner 28, and the prize allocator 29 are at least partly implemented using the processor 40 and associated software although it will be understood that other implementations are envisaged.

The gaming machine 10 can take a number of different forms.

In a first form, a player operable gaming device in the form of a stand alone gaming machine is provided wherein all or most components required for implementing the game are present in the gaming machine.

In a second form, a distributed architecture is provided wherein some of the components required for implementing the game are present in a player operable gaming device and some of the components required for implementing the game are located remotely relative to the gaming device. For example, a "thick client" architecture may be used wherein part of the game is executed on a player operable gaming terminal and part of the game is executed remotely, such as by a gaming server; or a "thin client" architecture may be used wherein most of the game is executed remotely such as by a gaming server and a player operable gaming terminal is used only to display audible and/or visible gaming information to the player and receive gaming inputs from the player.

However, it will be understood that other arrangements are envisaged. For example, an architecture may be provided wherein a gaming device is networked to a device server and the respective functions of the gaming machine and the gaming server are selectively modifiable. For example, the gaming machine may operate in stand alone gaming machine mode, "thick client" mode or "thin client" mode depending on the game being played, operating conditions, and so on. Other variations will be apparent to persons skilled in the art.

A gaming machine in the form of a stand alone gaming machine 50 is illustrated in FIG. 3. The gaming machine 50 includes a console 52 having a display 54 on which is displayed representations of a game 56 that can be played by a player. A mid-trim 60 of the gaming machine 50 houses a bank of buttons 62 for enabling a player to interact with the gaming machine, in particular during gameplay. The mid-trim 60 also houses a credit input mechanism 64 which in this example includes a coin input chute 64A and a bill collector 64B. Other credit input mechanisms may also be employed, for example, a card reader for reading a smart card, debit card or credit card.

A top box 66 may carry artwork 68, including for example pay tables and details of bonus awards and other information or images relating to the game. Further artwork and/or information may be provided on a front panel 69 of the console 52. A coin tray 70 is mounted beneath the front panel 69 for dispensing cash payouts from the gaming machine 50.

The display 54 is in the form of a video display unit, particularly a cathode ray tube screen device. Alternatively, the display 54 may be a liquid crystal display, plasma screen, or any other suitable video display unit. The top box 66 may also include a display, for example a video display unit, which may be of the same type as the display 54, or of a different type. The display 54 may comprise a touch screen usable by a player to interact with the gaming machine, in particular during game play.

The display 54 in this example is arranged to display representations of several reels, each reel of which has several associated symbols. Typically 3, 4 or 5 reels are provided. During operation of the game, the reels first appear to rotate then stop with typically three symbols visible on each reel. Game outcomes are determined on the basis of the visible symbols together with any special functions associated with the symbols.

A player marketing module (PMM) 72 having a display 74 is connected to the gaming machine 50. The main purpose of the PMM 72 is to allow the player to interact with a player loyalty system. The PMM has a magnetic card reader for the purpose of reading a player tracking device, for example as part of a loyalty program. However other reading devices may be employed and the player tracking device may be in the form of a card, flash drive or any other portable storage medium capable of being read by the reading device. In this example, the PMM 62 is a Sentinel III device produced by Aristocrat Technologies Pty Ltd.

Figure 4:
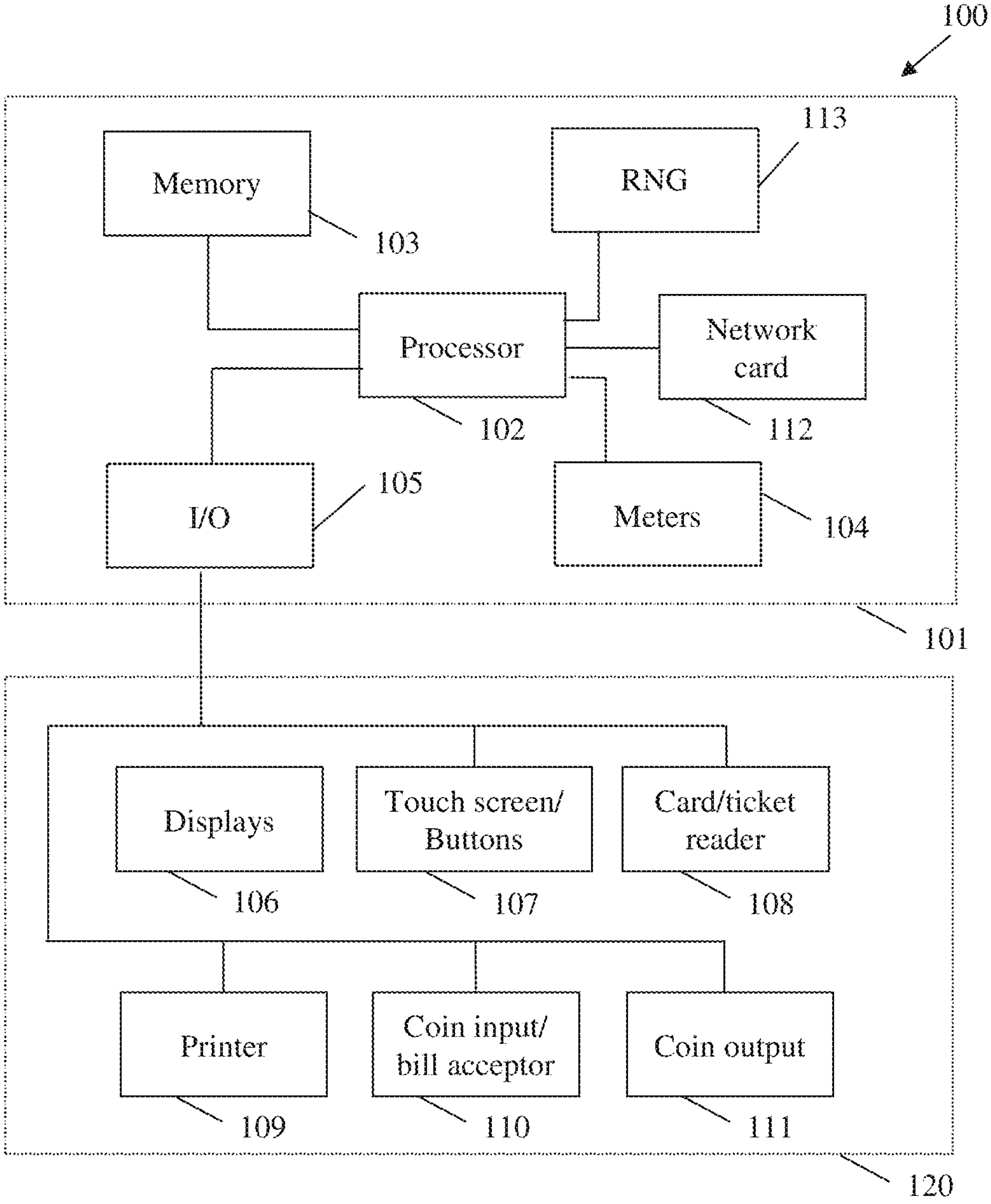
FIG. 4 is a schematic block diagram of operative components of the gaming machine shown in FIG. 3.

FIG. 4 shows a block diagram of operative components of a gaming device 100 which may be the same as or different to the gaming machine shown in FIG. 3.

The gaming machine 100 includes a game controller 101 having a processor 102. Instructions and data to control operation of the processor 102 in accordance with embodiments of the present invention are stored in a memory 103 which is in data communication with the processor 102.

Typically, the gaming machine 100 will include both volatile and non-volatile memory and more than one of each type of memory, with such memories being collectively represented by the memory 103.

Figure 5:
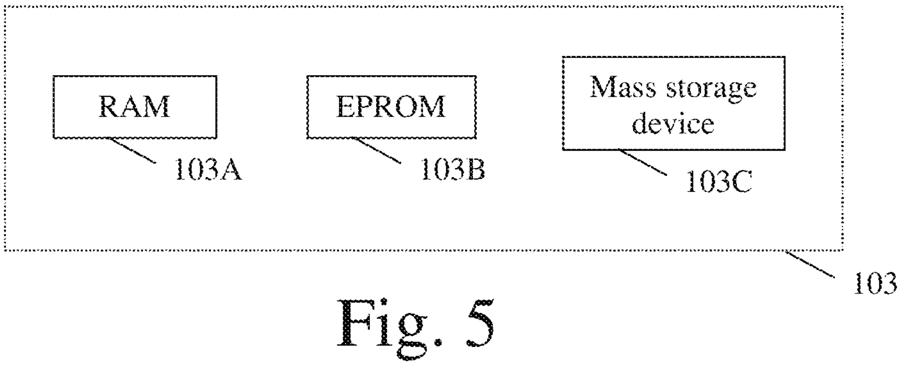
FIG. 5 is a schematic block diagram of components of a memory of the gaming machine shown in FIG. 3.

FIG. 5 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

The gaming machine 100 has hardware meters 104 for purposes including ensuring regulatory compliance and monitoring player credit, an input/output (I/O) interface 105 for communicating with a player interface 120 of the gaming machine 100, the player interface 120 having several peripheral devices. The input/output interface 105 and/or the peripheral devices may be intelligent devices with their own memory for storing associated instructions and data for use with the input/output interface or the peripheral devices. A random number generator module 113 generates random numbers for use by the processor 102.

In the example shown in FIG. 4, the peripheral devices that communicate with the game controller 101 comprise one or more displays 106, a touch screen and/or bank of buttons 107, a card and/or ticket reader 108, a printer 109, a bill acceptor and/or coin input mechanism 110 and a coin output mechanism 111. Additional hardware may be included as part of the gaming machine 100, or hardware may be omitted as required for the specific implementation.

In addition, the gaming machine 100 may include a communications interface, for example a network card 112. The network card may, for example, send status information, accounting information or other information to a central controller, server or database and receive data or commands from the central controller, server or database.

It is also possible for the operative components of the gaming machine 100 to be distributed, for example input/output devices 106, 107, 108, 109, 110, 111 may be provided remotely from the game controller 101.

Figure 6:
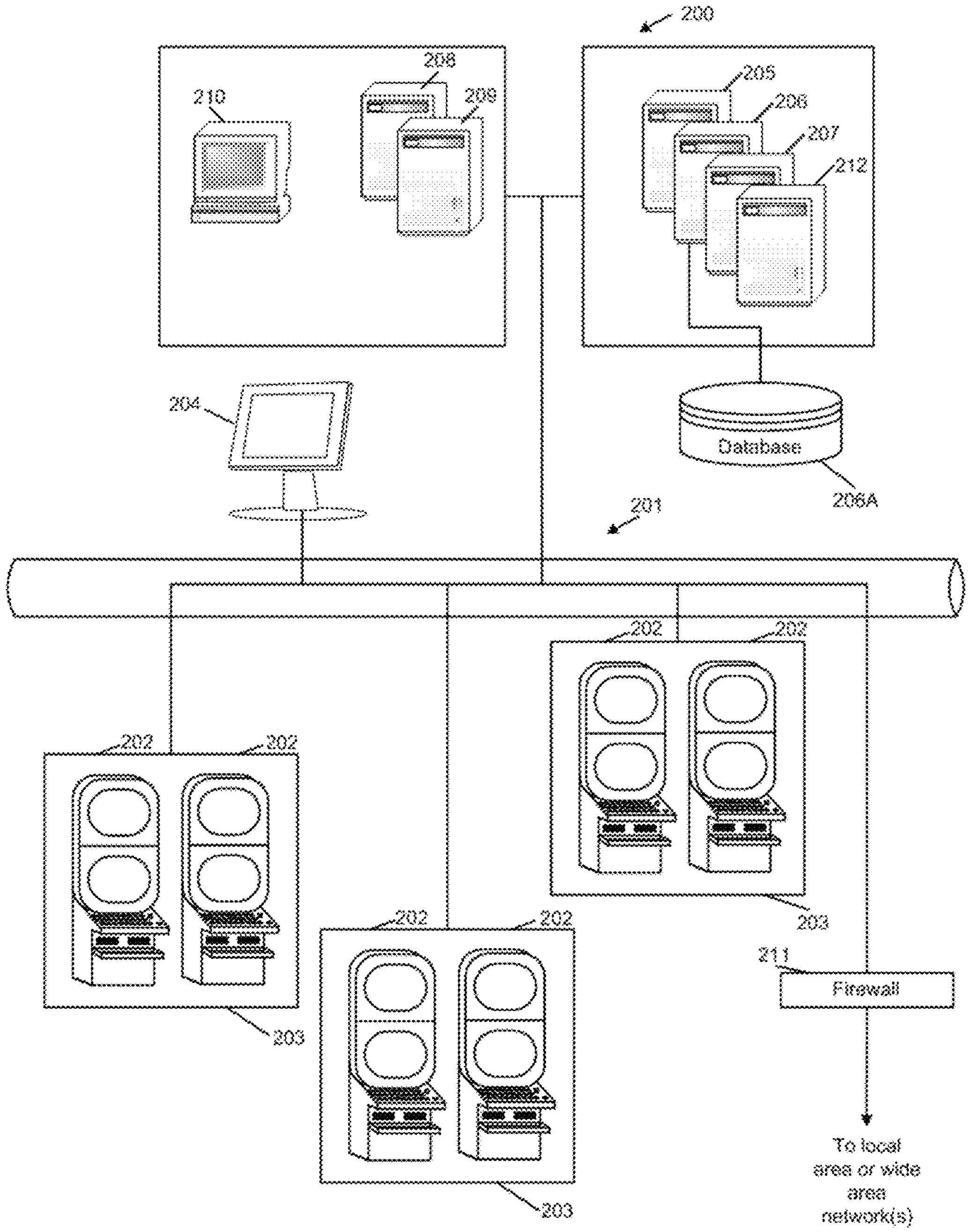
FIG. 6 is a schematic diagram of a gaming system in accordance with an embodiment of the present invention wherein the gaming system is implemented over a network.

FIG. 6 shows a gaming system 200 in accordance with an embodiment of the present invention. The gaming system 200 includes a network 201, which for example may be an Ethernet network, a LAN or a WAN. In this example, three banks 203 of two gaming machines 202 are connected to the network 201. The gaming machines 202 provide a player operable interface and may be the same as the gaming machines 40, 100 shown in FIGS. 3 and 4, or may have simplified functionality depending on the requirements for implementing game play. While banks 203 of two gaming machines are illustrated in FIG. 6, banks of one, three or more gaming machines are also envisaged.

One or more displays 204 may also be connected to the network 201. The displays 204 may, for example, be associated with one or more banks 203 of gaming machines. The displays 204 may be used to display representations associated with game play on the gaming machines 202, and/or used to display other representations, for example promotional or informational material.

In a thick client embodiment, a game server 205 implements part of the game played by a player using a gaming machine 202 and the gaming machine 202 implements part of the game. With this embodiment, as both the game server 205 and the gaming machine 202 implement part of the game, they collectively provide a game controller. A database management server 206 may manage storage of game programs and associated data for downloading or access by the gaming devices 202 in a database 206A.

In this example, the gaming system 200 enables players to participate in a Jackpot game by providing a Jackpot server 207 that is arranged to monitor and carry out the Jackpot game. The jackpot server is a server implementation of the jackpot controller 2 described earlier.

In a variation of the above thick client embodiment, the gaming machine 202 may implement the game, with the game server 205 functioning merely to serve data indicative of a game to the gaming machine 202 for implementation.

With this implementation, a data signal containing a computer program usable by the client terminal to implement the gaming system may be transferred from the game server to the client terminal, for example in response to a request by the client terminal.

In a thin client embodiment, the game server 205 implements most or all of the game played by a player using a gaming machine 202 and the gaming machine 202 essentially provides only the player interface. With this embodiment, the game server 205 provides the game controller. The gaming machine will receive player instructions, and pass the instructions to the game server which will process them and return game play outcomes to the gaming machine for display. In a thin client embodiment, the gaming machines could be computer terminals, e.g. PCs running software that provides a player interface operable using standard computer input and output components.

Servers are also typically provided to assist in the administration of the gaming system 200, including for example a gaming floor management server 208 and a licensing server 209 to monitor the use of licenses relating to particular games. An administrator terminal 210 is provided to allow an administrator to monitor the network 201 and the devices connected to the network.

The gaming system 200 may communicate with other gaming systems, other local networks such as a corporate network, and/or a wide area network such as the Internet, for example through a firewall 211.

A loyalty program server 212 may also be provided.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random number generator engine. Alternatively, a separate random number generator server could be provided.

Examples of specific implementations of a gaming system will now be described in relation to a stand alone gaming machine 50 although it will be understood that implementation may also be carried out using other gaming system architectures such as a network architecture of the type shown in FIG. 6.

In this example, the gaming machine comprises five reels, each reel corresponding to a display position group, each of which has an associated set of display positions for displaying symbols.

The reels are arranged to display standard symbols and one or more function symbols and win outcomes are determined on the basis of the symbols visible at the display positions when the reels stop rotating.

Typically, a player will purchase or otherwise obtain win entitlements such as several win lines which are used in the game to determine win outcomes. If the displayed symbols on the reels have symbols associated with a winning combination such as a winning combination disposed on a win line, the player wins a prize.

The gaming machine is operable in normal game mode and special game mode and may be arranged to commence special game mode when a predetermined game outcome occurs. Special game mode may comprise one or more free games. Special game mode may commence automatically on the basis of a game event occurring during a game such as display of a particular symbol, based on game outcomes determined by the gaming system, or may be prompted by a player pressing a button on the gaming machine 10 after the player has identified that a game outcome corresponding to special game mode requirements has occurred.

The gaming machine 10 may also be arranged so as to determine eligibility for special game mode, for example based on the amount or type of bet placed, based on certain time periods and so on.

Special game mode may also be arranged to commence when a special game is purchased by a player.

Figure 7:
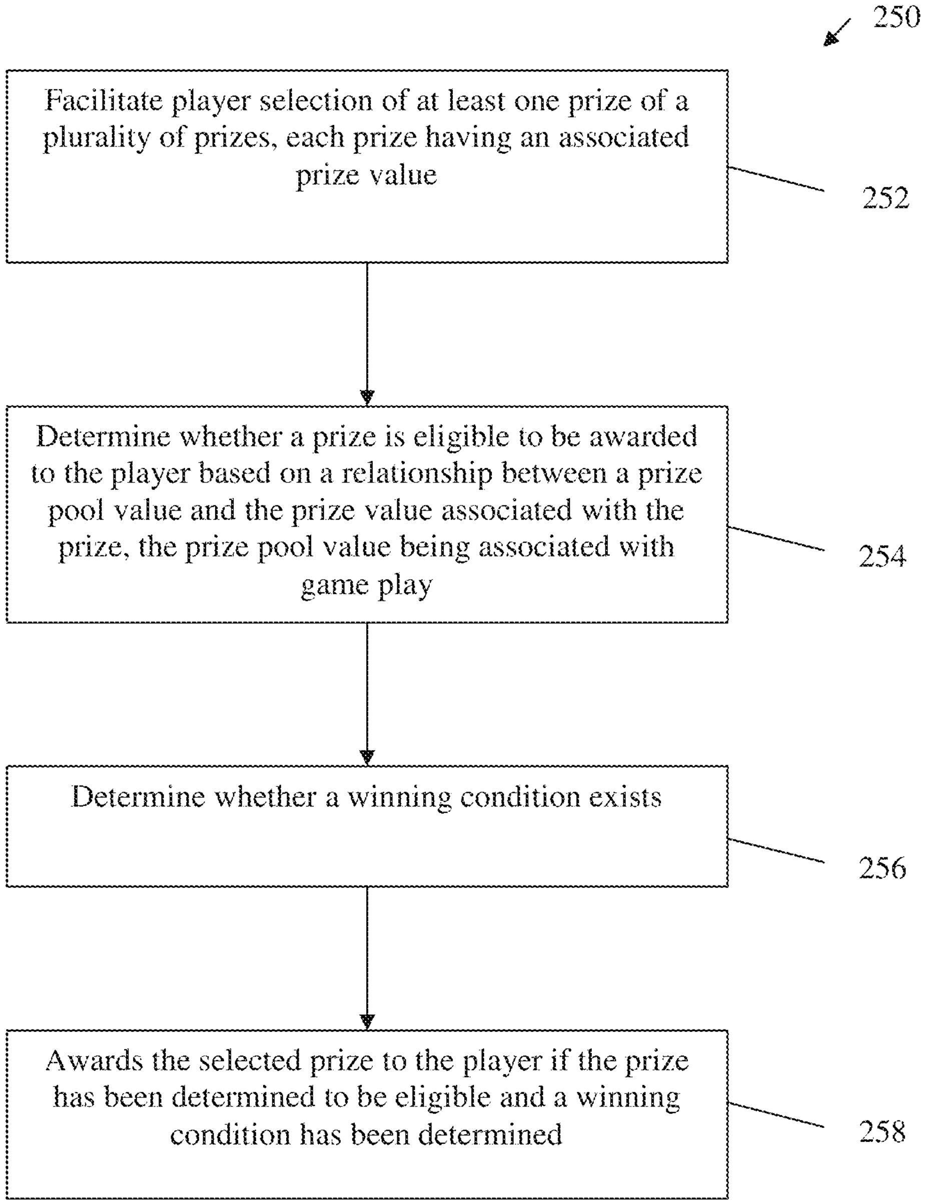
FIG. 7 is a flow diagram illustrating a method of gaming in accordance with an embodiment of the present invention.

The gaming machine is arranged to facilitate player selection of a prize from a plurality of jackpot prizes, and the jackpot controller 2 is arranged to determine if the selected prize is eligible, and to award the selected prize to the player if the prize is determined to be eligible and if a winning condition has been determined. This process is described in more detail with reference to method 250 as shown in FIG. 7.

In a first step 252, the gaming machine 10 facilitates player selection of at least one prize of a plurality of prizes. Each prize has an associated prize value. In a second step 254, the jackpot controller 2 determines whether a prize is eligible to be awarded to the player based on a relationship between the prize pool value stored in the prize pool 4, and the prize value associated with the prize stored in the prizes data 20 and/or the memory 3 of the jackpot controller 2.

In a third step 256, the gaming machine 10 or the jackpot controller 2 determines whether a winning condition exists, and in a fourth step 258 the gaming machine 10 awards the selected prize to the player if the prize has been determined to be eligible and a winning condition has been determined.

Figure 8:
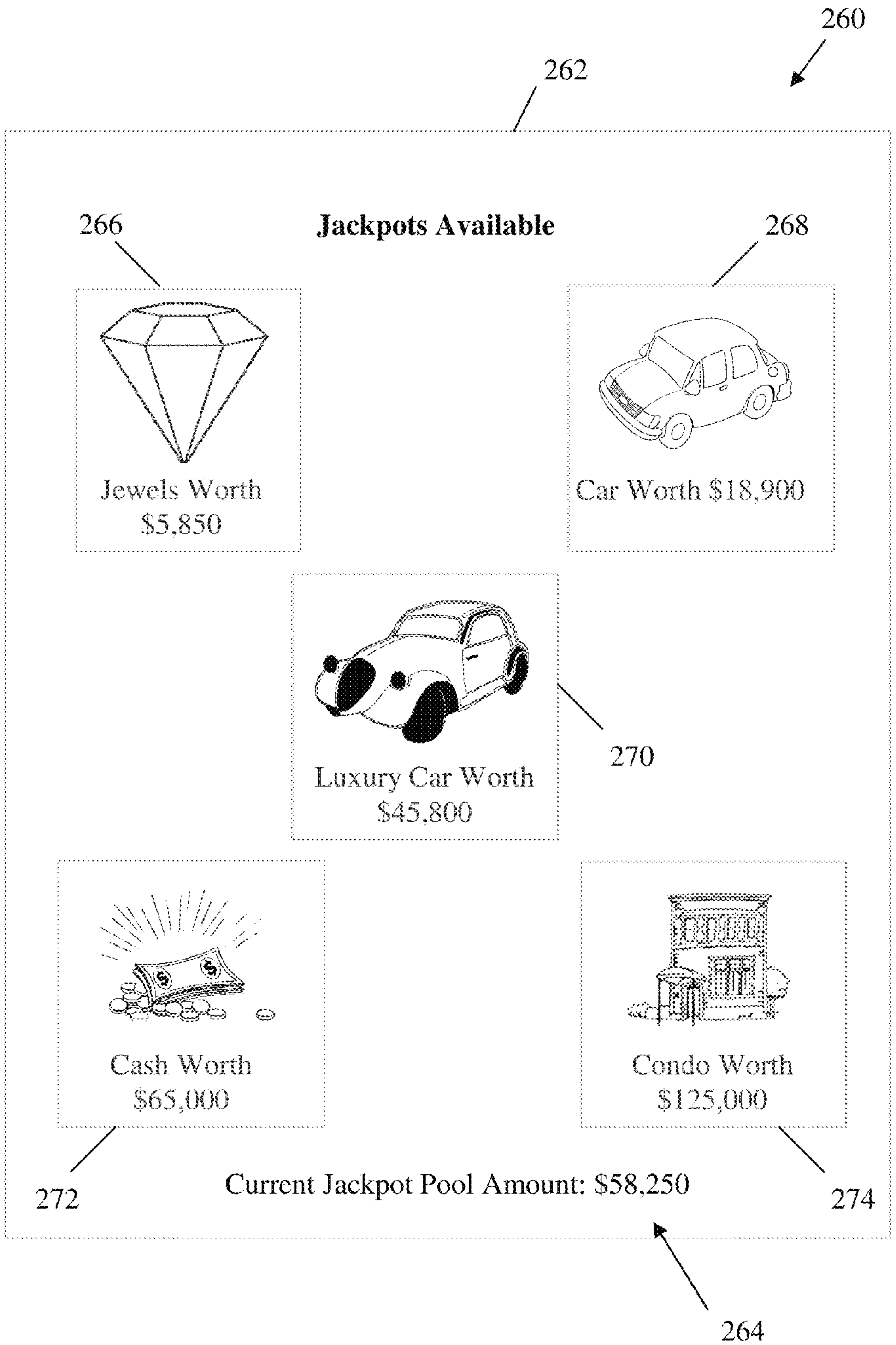
FIG. 8 is an example screen shot presented by a gaming machine in accordance with an embodiment of the present invention.

FIG. 8 illustrates an example screen shot 260 of a 'Jackpots Available' screen 262. The 'Jackpots Available' screen 262 is presented to a player when playing a game on the gaming machine 10. In this example, and prior to the player placing a wager and playing a game, the player is presented with prize pool value information 264, which indicates to the player the total value of the current jackpot pool. In this example, the total value of the current jackpot pool is $58,250.

The player is also presented with selectable jackpot prizes 266, 268, 270, 272, 274, each jackpot prize 266, 268, 270, 272, 274 having an associated prize value. In this example, a first jackpot prize 266 is a set of jewels having an associated value of $5,850, a second jackpot prize 268 is a car having an associated value of $18,900, a third jackpot prize 270 is a luxury car having an associated value of $45,800, a fourth jackpot prize 272 is cash having an associated value of $65,000 and a fifth jackpot prize 274 is a condo having an associated value of $125,000.

As the player is presented with the prize pool value information 264, the player is able to determine which prizes are currently eligible prizes. In this example, the player is able to determine that the first, second and third prizes 266, 268, 270 are currently eligible prizes as the prize value associated each of the first, second and third prizes 266, 268, 270 is less than or equal to the jackpot pool indicated by the prize pool value information 264.

In this example, the gaming machine 10 may be arranged to facilitate player selection of a jackpot that is not currently eligible, such as the fourth and fifth prizes 272, 274, however the player will not be awarded a jackpot prize that is not currently eligible if a jackpot winning condition is determined.

In one embodiment, the gaming machine 10 is arranged such that only eligible jackpot prizes are selectable by a player, and the gaming machine 10 is arranged to visually indicate which jackpot prizes are currently eligible and therefore selectable. Further, the gaming machine 10 may be arranged as an alternative such that the prize pool value information 264 is not displayed on the 'Jackpots Available' screen 262.

After the player makes a jackpot prize selection via the 'Jackpots Available' screen 262, the player plays a game. In response to playing the game, the player has a chance of winning the selected jackpot prize if the jackpot prize is determined to be eligible, and if a jackpot prize winning condition, such as the generation of a particular random number, is determined.

The gaming machine 10 is arranged to enable the player to play for the selected jackpot prize until the player selects a different jackpot prize. In this example, the gaming machine 10 is arranged to facilitate player selection of a jackpot prize at any time, and the gaming machine 10 can be arranged to present the 'Jackpots Available' screen 262 to the player when the player presses an appropriate button of the gaming machine 10. Typically, the gaming machine 10 is arranged to facilitate selection of a jackpot prize by a player at the beginning of a gaming session, at the beginning of any standard game, and/or at the beginning of any feature game.

An example wherein four different players are playing on respective gaming machines that are linked to the jackpot controller 2 will now be described. Wagers made on the gaming machines have contributed to the prize pool value which, in this example is presently at a value of $58,250, as shown in FIG. 8.

Each player has been presented with an opportunity to select a jackpot prize. A first player has selected the second jackpot prize 268 being the car having an associated value of $18,900, a second player has selected the third jackpot prize 270 being the luxury car having an associated value of $45,800, a third player has selected the first jackpot prize 266 being the set of jewels having an associated value of $5,850, and a fourth player has selected the fifth jackpot prize 274 being the condo having an associated value of $125,000.

If a jackpot winning condition is determined as a result of a game played by any one of the players playing a game on the linked gaming machines or similar, the jackpot controller 2 will determine which prizes are eligible prizes for the current prize pool value of $58,250. In this case, the prize eligibility determiner 5 of the jackpot controller 2 determines that the first, second and third jackpot prizes 266, 268, 270, as selected by the third, first and second players respectively, are eligible prizes as their respective prize values are less than the current prize pool value.

The prize selector 6 of the jackpot controller 2 then randomly selects a jackpot prize that has been determined to be eligible. In this example, the prize selector 6 randomly selects the second jackpot prize 268. The prize selection is communicated from the jackpot controller 2 to the gaming machines 10 and the prize allocator 29 of a respective gaming machine 10 then awards the second jackpot prize 268 to the player who also selected the second jackpot prize 268, in this example the first player. It will be appreciated that the jackpot prize may be awarded to the player by the jackpot controller 2.

It will be appreciated that the gaming machine 10 or the jackpot controller 2 may be arranged to award the actual jackpot prize to a player, or an equivalent value amount to the player. In this example, the first player can either receive a car corresponding to the selected jackpot prize, or a cash prize of $18,900.

After awarding the prize to the first player, the jackpot controller 2 subtracts the prize value associated with the awarded prize from the value of the prize pool 4, and the prize pool value is updated to reflect awarding of the prize. In this example, the prize pool value is updated to become $39,350, being $58,250 subtract $18,900.

In a next game, eligible prizes would be determined to be those having a prize value that is less than or equal to the current prize pool value of $39,350. In this example, eligible prizes in the next game would be the first and second jackpot prizes 266, 268.

A scenario may arise wherein no player has selected the same jackpot prize that was selected by the jackpot controller 2. In this case, the jackpot controller 2 is arranged to select a prize that has a next higher associated prize value. For example, if in the previous example no player had selected the second jackpot prize 268, that is, the car having a prize value of $18,900, the jackpot controller 2 is arranged to select the third jackpot prize 270: the luxury car having a prize value of $45,800. If no player has selected the third jackpot prize 270, there is no higher eligible jackpot prize and the gaming system will roll over to the first jackpot prize 266, in this case the jewels having a prize value of $5,850. If a player had selected the first jackpot prize 266, that player is awarded the first jackpot prize 266.

The value of the first jackpot prize 266 is then subtracted from the prize pool value. In this example, the prize pool value is updated to become $52,400, being $58,250 subtract $5,850.

In a next game, eligible prizes would be those having a prize value that is less than or equal to the current prize pool value of $52,400. In this example, eligible prizes in the next game would be the first, second and third jackpot prizes 266, 268, 270.

A scenario may arise wherein more than one player has selected the same jackpot prize that was also selected by the jackpot controller 2. In such a scenario, the jackpot controller 2 can be arranged to determine which player will receive the jackpot prize. For example, the jackpot controller 2 can be arranged to randomly determine which player will receive the jackpot prize. Alternatively, the jackpot controller 2 may be arranged to award the jackpot prize to the next player who selects the jackpot prize that was selected by the jackpot controller 2.

Modifications and variations as would be apparent to a skilled addressee are determined to be within the scope of the present invention.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A gaming machine comprising:

a credit input mechanism comprising at least one of a coin input chute, a bill acceptor, a card reader, and a ticket reader, the credit input mechanism configured to establish a credit balance that is increasable and decreasable based at least on wagering activity and to contribute at least a portion of wagered credit to a prize pool;

a prize eligibility determiner configured to determine whether each prize of a plurality of prizes is eligible to be awarded to a player based on a relationship between a prize pool value of the prize pool and a prize value associated with the prize, the prize pool value being associated with game play, wherein each prize of the plurality of prizes has a respective associate prize value;

a prize selector configured to facilitate player selection of at least one player-selected prize of the plurality of prizes; and a winning condition determiner configured to determine whether a winning condition exists, and wherein the gaming machine is configured to:

select a first system-selected prize of the plurality of prizes;

award the player-selected prize to the player when the player-selected prize is eligible, the winning condition exists, and the first system-selected prize is the same as the player-selected prize; and select a second system-selected prize when the player-selected prize is eligible, the winning condition exists, and the first system-selected prize is not the same as the player-selected prize.

2. The gaming machine of claim 1, wherein the prize eligibility determiner is further configured to determine that each prize is eligible when the prize pool value is greater than or equal to a prize value associated with the respective prize.

3. The gaming machine of claim 1, wherein the winning condition determiner is further configured to determine the winning condition exists when the prize pool value is greater than or equal to a trigger value.

4. The gaming machine system of claim 3 further configured to randomly select the trigger value from a value range.

5. The gaming machine of claim 4, wherein the value range includes at least one prize value associated with at least one prize of the plurality of prizes.

6. The gaming machine of claim 1, wherein the winning condition determiner is further configured to determine the winning condition exists in response to a game event.

7. The gaming machine of claim 1, wherein the winning condition determiner is further configured to determine the winning condition exists in response to the generation of at least one random number.

8. The gaming machine of claim 1, wherein the winning condition determiner is further configured to determine the winning condition exists based on one or more game events occurring in a game played by a further player.

9. The gaming machine of claim 1 further comprising a network interface configured to receive information indicative of the winning condition that occurs during game play at a linked gaming machine associated with the gaming system.

10. The gaming machine of claim 1, wherein the prize selector is further configured to facilitate player selection of at least one prize only from eligible prizes.

11. The gaming machine of claim 1 further configured to select the first and second system-selected prizes only from eligible prizes.

12. The gaming machine of claim 1 further configured to select the second system-selected prize from eligible prizes that have an associated prize value that is higher than a prize value associated with the first system-selected prize.

13. The gaming machine of claim 12, wherein the second system-selected prize has an associated prize value that is next highest in value after the prize value associated with the first system-selected prize.

14. The gaming machine of claim 1 further configured to select the second system-selected prize having an associated prize value that is lower than a prize value associated with the first system-selected prize when the first system-selected prize has an associated prize value that is higher than respective associated prize values of other eligible prizes.

15. The gaming machine of claim 1, wherein, when each player of a plurality of players has selected a respective player-selected prize that is eligible, and the winning condition exists, the gaming machine is further configured to determine which player of the plurality of players will receive the respective player-selected prize.

16. The gaming machine of claim 15 further configured to randomly determine which player of the plurality of players will receive the respective player-selected prize.

17. The gaming machine of claim 15 further configured to determine which player of the plurality of players will receive the respective player-selected prize based on a further prize selection performed by each player.

18. The gaming machine of claim 1, wherein the prize pool is a progressive jackpot prize pool, and the prize pool value is a value of the progressive jackpot prize pool.

19. The gaming machine of claim 1, wherein the plurality of prizes includes a plurality of jackpot prizes, and the prize selector is configured to facilitate selection of at least one jackpot prize of the plurality of jackpot prizes.

20. A method of gaming comprising the steps of:

establishing a credit balance using a credit input mechanism including at least one of a coin input chute, a bill acceptor, a card reader, and a ticket reader, the credit balance increasable and decreasable based at least one wagering activity;

contributing, using the credit input mechanism, at least a portion of wagered credit to a prize pool;

determining, using a prize eligibility determiner, whether each prize of a plurality of prizes is eligible to be awarded to a player based on a relationship between a prize pool value of the prize pool and a prize value associated with the prize, the prize pool value being associated with game play, wherein each prize of the plurality of prizes has a respective associate prize value;

facilitating, using a prize selector, player selection of at least one player-selected prize of the plurality of prizes;

determining, using a winning condition determiner, whether a winning condition exists;

selecting, using the prize selector, a first system-selected prize of the plurality of prizes;

awarding the player-selected prize to the player if the player-selected prize is eligible, the winning condition exists, and the first system-selected prize is the same as the player-selected prize; and selecting a second system-selected prize when the player-selected prize is eligible, the winning condition exists, and the first-system selected prize is not the same prize as the player-selected prize.

21. The method of gaming of claim 20, wherein determining whether each prize of a plurality of prizes is eligible comprises determining whether the prize pool value is greater than or equal to a prize value associated with the respective prize.

22. The method of gaming of claim 20, wherein determining whether the winning condition exists comprises determining whether the prize pool value is greater than or equal to a trigger value.

23. The method of gaming of claim 22 further comprising randomly selecting the trigger value from a value range.

24. The method of gaming of claim 23, wherein the value range includes at least one prize value associated with at least one prize of the plurality of prizes.

25. The method of gaming of claim 20, wherein determining whether the winning condition exists comprising determining a game event has occurred.

26. The method of gaming of claim 20, wherein determining whether the winning condition exists comprising determining generation of at least one random number has occurred.

27. The method of gaming of claim 20, wherein determining whether the winning condition exists comprising determining one or more game events in a game played by a further player have occurred.

28. The method of gaming of claim 20 further comprising receiving information indicative of the winning condition that occurs during game play at a linked gaming machine.

29. The method of gaming of claim 20, wherein facilitating player selection of at least one player-selected prize comprises facilitating player selection of a player-selected prize only from eligible prizes.

30. The method of gaming of claim 20, wherein selecting a first system-selected prize of the plurality of prizes comprises selecting the first system-selected prize only from eligible prizes.

31. The method of gaming of claim 20, wherein selecting the second system-selected prize comprises selecting the second system-selected prize from eligible prizes that have an associated prize value that is higher than a prize value associated with the first system-selected prize.

32. The method of gaming of claim 31, wherein the second system-selected prize has an associated prize value that is next highest in value after the prize value associated with the first system-selected prize.

33. The method of gaming of claim 20, wherein selecting the second system-selected prize comprises selecting the second system-selected prize having an associated prize value that is lower than a prize value associated with the first system-selected prize when the first system-selected prize has an associated prize value that is higher than respective associated prize values of other eligible prizes.

34. The method of gaming of claim 20 further comprising, when each player of a plurality of players has selected a respective player-selected prize that is eligible, and the winning condition exists, determining which player of the plurality of players will receive the respective player-selected prize.

35. The method of gaming of claim 34 further comprising randomly determining which player of the plurality of players who will receive the respective player-selected prize.

36. The method of gaming of claim 34 further comprising determining which player who will receive the respective player-selected prize based on a further prize selection performed by each player.

37. The method of gaming of claim 20, wherein the prize pool is a progressive jackpot prize pooh and the prize pool value is a value of the progressive jackpot prize pool.

38. The method of gaming of claim 20, wherein the plurality of prizes are a plurality of jackpot prizes, the method further comprising facilitating selection of at least one jackpot prize of the plurality of jackpot prizes.

39. A gaming system comprising:

a credit input mechanism comprising at least one of a coin input chute, a bill acceptor, a card reader, and a ticket reader, the credit input mechanism configured to establish a credit balance that is increasable and decreasable based at least on wagering activity and to contribute at least a portion of wagered credit to a prize pool;

a network interface configured to communicate information indicative of a player's selection of at least one player-selected prize of a plurality of prizes to a jackpot controller, each prize of the plurality of prizes having an associated prize value, the jackpot controller being configured to:

determine whether a particular prize of the plurality of prizes is eligible to be awarded to the player based on a relationship between a prize pool value of the prize pool and the prize value associated with the particular prize, the prize pool value being associated with game play;

determine whether a winning condition exists;

select a first controller-selected prize of the plurality of prizes; and facilitate awarding the player-selected prize to the player when the player-selected prize has been determined to be eligible, the winning condition exists, and the first controller-selected prize is the same as the player-selected prize; and select a second controller-selected prize when the player-selected prize is eligible, the winning condition exists, and the first controller-selected prize is not the same as the player-selected prize.

* * * * *